Figure 1:
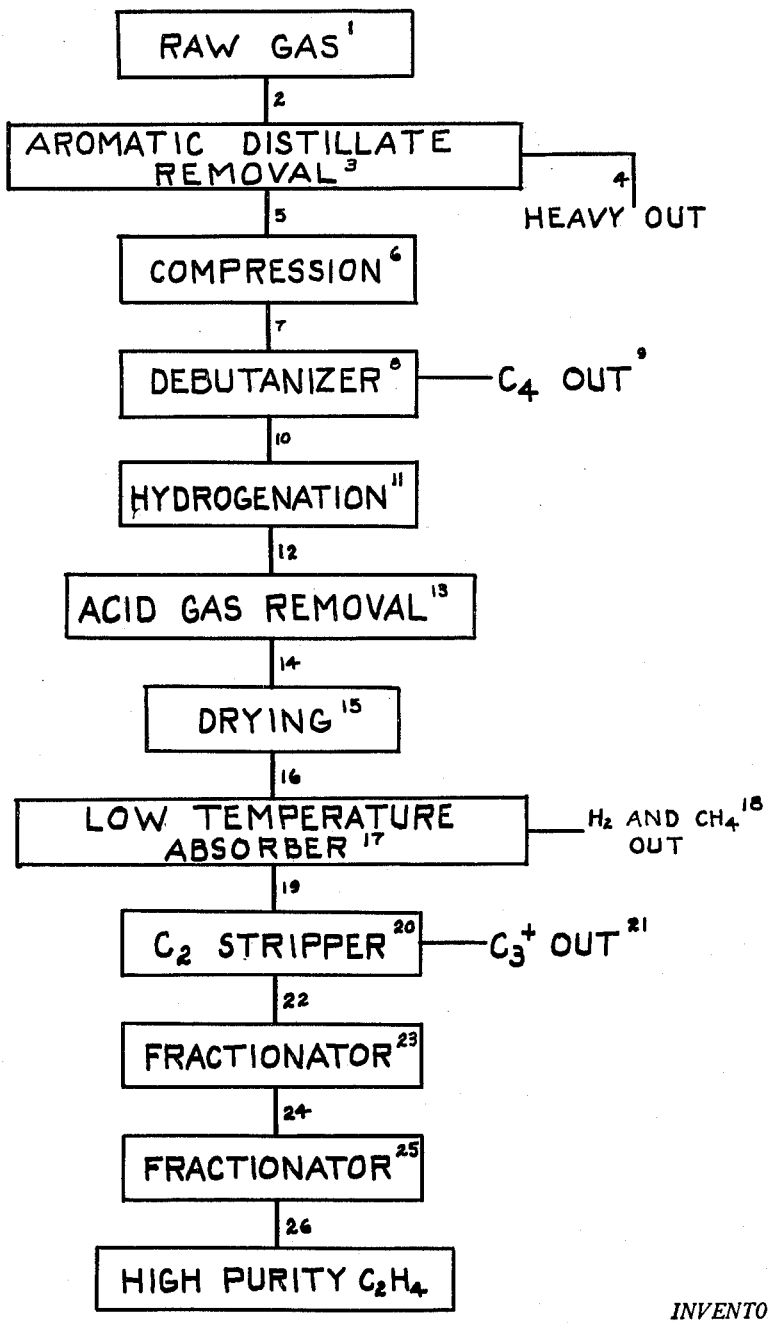

3,003,008
SELECTIVE HYDROGENATION OF ACETYLENES IN THE PRESENCE OF OLEFINIC GASES CONTAINING UNSATURATED C₄ HYDROCARBONS

Harold W. Fleming and William R. Gutmann, Louisville, Ky., assignors to Catalysts and Chemicals Inc., Louisville, Ky., a corporation of Delaware
Filed Oct. 13, 1958, Ser. No. 766,761
4 Claims. (Cl. 260—677)

This invention concerns a process for treating mixtures comprising olefins and containing substantial proportions of unsaturated $C_4$ hydrocarbons and one or more other hydrocarbons with an acetylenic group. It pertains especially to the treatment of mixtures comprising short chain olefins and conjugated diolefins in which it is desired to remove the more highly unsaturated impurities.

Olefins are produced in dilute form but in large quantities in various processes by the pyrolysis of petroleum fractions and other hydrocarbon starting materials. The olefin containing mixtures obtained in such processes usually comprise a variety of hydrocarbons other than olefins and separation of the latter in a form suitable for use, such as in the production of polyethylene, has proven difficult. For instance, cracked butanes, cracked oil gas, or refinery gas, which are well-known sources of olefins, usually contain paraffinic hydrocarbons ranging from methane to hexane, olefins such as ethylene, propylene, butylene, amylene and hexenes, diolefins such as propadiene, 1-3 butadiene, 1-2 butadiene, isoprene, piperylene and a small percentage but appreciable amount of acetylenic hydrocarbons such as acetylene, methyl acetylene, ethyl acetylene, vinyl acetylene, etc.

Although such mixtures may be distilled to obtain fractions consisting for the most part of hydrocarbons having the same number of atoms in the molecule and the olefin content of each fraction may be concentrated by the usual purification procedures such as by solvent extraction, the acetylenic hydrocarbons and other highly unsaturated impurities of close to the same boiling point as the olefins and diolefins tend to accompany the latter during such treatments. Thus, for example, 1-3 butadiene which has been recovered from cracked oil gas by such treatment usually retains a minor amount of less than 0.1 molecular equivalent of acetylenic hydrocarbon such as methyl acetylene, ethyl acetylene, etc. and may also contain a small but appreciable proportion of unconjugated diolefins such as propadiene.

Heretofore it was practiced to remove such highly unsaturated impurities by a process which involved the hydrogenation thereof over a suitable catalyst which was selective to the extent that negligible amounts of olefins were destroyed. In such processes it was necessary that the gas mixture contain 2% or less of unsaturated $C_4$ hydrocarbons in order to prevent fouling of the catalyst. Further if the gas stream contained dilute concentrations of butadiene, the butadiene was hydrogenated by passage over the catalyst and was effectively lost. Since butadiene is worth currently about 14 to 15 cents per pound, it would become desirable to effect its separation from the raw gas prior to the hydrogenation stage in order to prevent loss thereof. In addition, as indicated above, if the total $C_4$ unsaturate concentration exceeded about 2%, the practice has been to effect separation from the main body of gas prior to the hydrogenation step. In any event, the $C_4$ olefins, if separated prior to the hydrogenation step, are contaminated with acetylenic and diolefinic impurities and require further treatment in many instances to be suitable for their intended use.

It is an object of the invention to provide a simple and inexpensive method whereby vapor mixtures comprising a substantial proportion of unsaturated $C_4$ hydrocarbon impurities incident to the manufacture of said olefins and a minor amount of highly unsaturated acetylenes or alpha beta diolefins whereby the latter highly unsaturated impurities may be catalytically hydrogenated without destruction of the unsaturated $C_4$ hydrocarbons or the short chain olefins. A more specific object is to provide a method of purifying by hydrogenation and thereafter by separation of unsaturated $C_4$ olefins and diolefins from a gas stream containing shorter chain olefins as a major constituent. Still another object involves hydrogenation of a gas stream containing $C_4$ and shorter chain olefins, separation of the $C_4$ olefins therefrom and subsequent hydrogenation of the shorter chain olefins to effect maximum purification thereof. Aside from the acetylenes, the highly unsaturated hydrocarbon impurities are in most instances alpha beta unsaturated aliphatic hydrocarbons having no hydrogen atom on the beta carbon atom. That is to say, they are alpha acetylenes or 1-2 diolefins. For convenience such impurities are referred to herein as highly unsaturated hydrocarbon impurities. Other objects will be apparent from the following description of this invention.

We have found that, by treatment of such gas compositions over a selective hydrogenation catalyst under conditions of temperature, pressure and space velocity such that the highly unsaturated impurities are removed to a level of from 100 to 1000 parts per million, there is substantially no loss of the $C_4$ conjugated diolefins and olefins. Thereafter in one embodiment the $C_4$ hydrocarbons are separated from the treated gas mixture and the olefins, after concentration as by distillation or solvent extraction, are passed over a palladium catalyst so that the residual highly unsaturated impurities are substantially completely removed. By this process, the need for a debutanizing operation prior to the first hydrogenation stage is eliminated, the separated $C_4$ olefins and diolefins are purified to the extent that efficient utilization thereof is possible and the product olefins contain only a few parts per million of highly unsaturated impurities.

While we do not wish to be bound in any way by the accuracy of any theory or hypothesis herein expressed, it is believed that the phenomenon of selectivity of acetylenes and alpha beta diolefins versus conjugated diolefins is not primarily a matter of rate of reaction but rather is a matter of adsorption of the reactants on the activated surface of the catalyst. It is well known that the rate of hydrogenation reactions is accelerated by an increase in the hydrogen partial pressure. Our experience has indicated, however, that the difference in the rate of reaction between the various acetylenic and diolefinic compounds is so marginal that selectivity between, for example, an alpha beta diolefin and a conjugated diolefin can not be satisfactorily explained. We proposed, however, that in addition to the factors already indicated selectivity is affected by the adsorption of—say—an acetylene on the most active centers of the catalyst's surface. As a consequence the conjugated diolefins are not adsorbed on the active surfaces in sufficient quantities to effect appreciable hydrogenation thereof. Thus, by regulating the concentration of the acetylenes at the outlet of the reactor at a predetermined level, selectivity can be achieved. In further expanding the theory of this mechanism, our observations indicate that on the activated catalytic surface the reactants are adsorbed in the following order: acetylene, alkyl acetylenes, alpha beta diolefins, conjugated diolefins and mono olefins. It follows, therefore, that by adjusting the flow of reactants over the catalyst so that there is maintained a level of the first three classes of reactants in the effluent, the latter two classes of reactants are not hydrogenated. Further, we have found that if the conjugated diolefins are not appreciably hydrogenated, the mono olefins are not hydrogenated at all. Since the phenomenon is primarily adsorptive, the initial concentration and the percent conversion of the highly unsaturated hydrocarbon is relatively unimportant. We have further observed that the presence of three or four carbon mono olefins have a definite effect on this selectivity. It is believed, therefore, that the three and four carbon mono olefins in some unexplained manner affect or mask the adsorption of the conjugated butadiene without affecting the adsorption of the alpha beta diolefins. Thus, in order to prevent hydrogenation of butadiene in a gas stream containing no three and four carbon mono olefins an acetylene conversion of between 85 to 92% was obtained. However, with a gas stream containing about 10% $C_4$ mono olefins an acetylene conversion of about 98% was achieved without noticeable hydrogenation of butadiene.

The invention will be better understood by referring to the accompanying drawing and the following examples.

Figure 2:
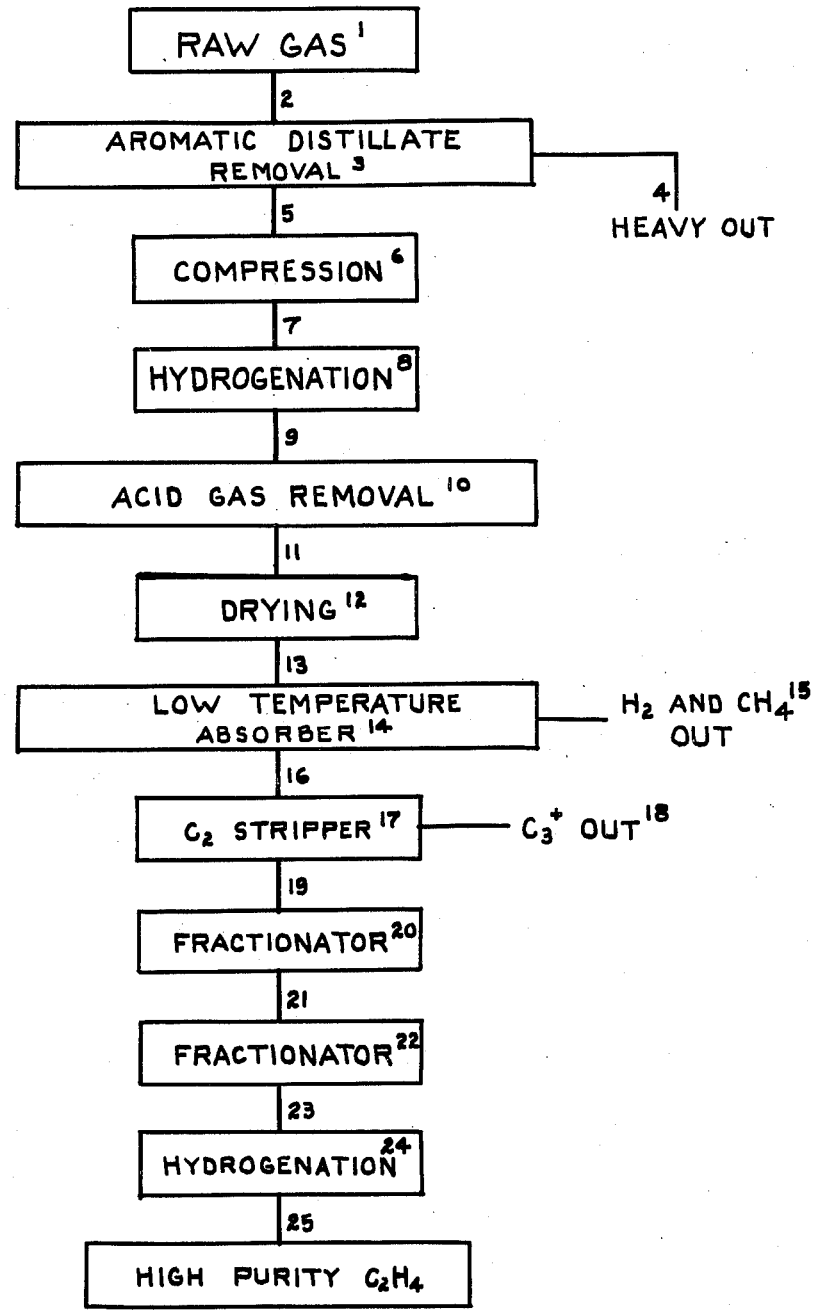

FIGURE 1 is a diagrammatic flowsheet of a conventional olefin purification scheme. FIGURE 2 illustrates a preferred scheme for purifying olefins according to this invention.

Referring now to FIGURE 1, numeral 1 illustrates the source of the raw gas which may be received at a temperature of about 85 to about 110° F. and a pressure of about atmospheric. This gas comprises olefins contaminated with acetylenic compounds, diolefinic compounds and contains water vapor and entrained water as well as other undesirable contaminants such as fine carbon particles, heavy hydrocarbons, aromatics, tars, etc. This gas mixture is passed through line 2 to the aromatic distillate removal operation designated by numeral 3 which is accomplished by means of a scrubber wherein the gas is scrubbed to remove undesirable contaminants and thereby prevent deposition thereof on the catalyst within the hydrogenation reactor. The scrubbing medium may comprise a heavy mineral oil such as a number 2 fuel oil which is passed through the scrubber countercurrently to the movement of the cracked gas mixture. The heavy hydrocarbons as well as fine carbon particles pass out the bottom of the scrubber through line 4 and the light hydrocarbons pass through line 5 to the compression stage indicated by numeral 6. The gaseous mixture is then compressed to a pressure which may vary from about atmospheric to about 900 p.s.i.g., preferably, however, between 40 and 600 p.s.i.g. The temperature of the gaseous mixture as a result of the compression is raised to a temperature of about 200 to 300° F. and then passes through line 7 to the debutanizer designated by numeral 8. The mixture is scrubbed with a solvent, such as a light mineral oil, which has the property of selectively absorbing unsaturated $C_4$ and higher hydrocarbons. The $C_4$'s absorbed in oil are eliminated from the system through line 9 and the $C_3$ and lower hydrocarbons pass through line 10 to the hydrogenation zone 11. Alternately the $C_4$ hydrocarbons may be removed in the debutanizer zone 8 in several other ways. For example, the pyrolysis mixture may be cooled and treated with a condensation catalyst, such as aqueous sulfuric acid of activity sufficient to polymerize and condense the diolefins without appreciably affecting the other unsaturated compounds present or the mixture may be cooled under pressure and thereafter distilled to separate the hydrocarbons containing four or more carbon atoms, which include all diolefins, from the more volatile substances such as hydrogen, ethylene, propylene and acetylene. The treated gas mixture is then passed through a bed of selective hydrogenation catalyst at a temperature in the range of 200 to 600° F., a space velocity of 500 to 3000 and at a pressure of 1 to 60 atmospheres whereby the highly unsaturated compounds are selectively hydrogenated without appreciable hydrogenation of the mono olefins. This results in a gas containing highly unsaturated hydrocarbons such as acetylenes in a concentration of about 10 to 50 parts per million and a total loss of olefins of less than almost 2%. Suitable hydrogenation catalysts comprise the sulfides of nickel, cobalt and molybdenum supported on inert carriers as well as compounds or mixtures of the metals and metal oxides of group 6 and 8 metals such as cobalt-molybdenum, nickel-chromium, nickel-molybdenum, etc. supported on durable inert carriers. The treated gases are transferred via line 12 to the acid gas removal stage designated by numeral 13. Acid gas such as carbon dioxide and hydrogen sulfide is removed by scrubbing with caustic or amines. The effluent is carried via line 14 to the drying section 15 wherein the gas is dried by passing over conventional desiccants as for example activated alumina, activated bauxite, Porocel, etc. The dried gas is then conveyed via line 16 to the low temperature absorption section which is designated by numeral 17. Normally liquid pentane is used as an absorbent; however, liquid propane or a mixture of liquid pentane and propane may be utilized. In this section the $C_2$ and higher hydrocarbons are absorbed in the liquid pentane mixture and hydrogen and methane are passed overhead via line 18. The absorbent containing the $C_2$ and higher hydrocarbons are conveyed via line 19 to the stripping section designated by numeral 20. In this section the absorbents are heated and the $C_2$'s passed overhead while the $C_3$'s and higher pass out the bottom with the liquid pentane through line 21. The $C_2$ hydrocarbons pass via line 22 to a fractionator designated by numeral 23 wherein the residual methane and hydrogen are separated from the $C_2$ hydrocarbons. The concentrated olefins pass via line 24 to a fractionating column designated by numeral 25 which effects the final separation of the $C_2$ olefins from the $C_2$ paraffins. The concentrated olefins are then removed via line 26 to storage. The ethylene thus concentrated to more than 99+% contains less than about 20 to 50 p.p.m. of acetylenes and other highly unsaturated impurities.

Referring now to FIGURE 2, numeral 1 illustrates the source of the raw gas which may be received at a temperature of about 85 to about 110° F. and a pressure of about atmospheric. This gas comprises olefins contaminated with acetylenic compounds, diolefins, and contains water vapor and entrained water as well as other undesirable contaminants such as fine carbon particles, heavy hydrocarbons, aromatics, tars, etc. This gas is passed through line 2 to the aromatic distillate removal operation designated by numeral 3 which is effected by means of an oil scrubber wherein the gas is scrubbed to remove undesirable contaminants. The scrubbing medium may comprise a heavy mineral oil such as a number 2 fuel oil which is passed through the scrubber countercurrently to the movement of the cracked gas mixture. These contaminants pass out the bottom of the scrubber. The light hydrocarbons pass through line 5 to a compression stage indicated by numeral 6. The gaseous mixture is then compressed to a pressure which may vary from 1 to 60 atmospheres. Preferably, however, the pressure is between about 40 and 600 p.s.i.g. The temperature of the gaseous mixture as a result of the compression is raised to a temperature of about 200 to 300° F. and then passes through line 7 to the hydrogenation zone designated by numeral 8. The hydrogenation reactor contains a bed of selective hydrogenation catalyst such as the sulfides or oxides of group 8 metals as well as compounds or mixtures of metals or metal oxides of group 6 and group 8. Thus, for example, suitable catalysts comprise the oxides of cobalt and molybdenum, nickel and chromium, nickel and molybdenum, cobalt sulfide, nickel sulfide or molybdenum sulfide preferably on durable inert carriers. The treated gas mixture is passed through the bed of selective hydrogenation catalyst at a temperature in the range of from about 200 to about 600° F., a space velocity of about 500 to about 3000 and a pressure of about from 1 to about 60 atmospheres. These conditions are varied so that conversion of the highly unsaturated compounds is such that the level in the effluent varies between about 100 and 1000 p.p.m. If the initial gases contain a substantial proportion of carbonyl sulfide compounds, the treated gases may be passed over a bed of organic sulfur conversion catalyst as is disclosed and claimed in our copending application, Serial No. 766,713, which was filed concurrently herewith, now U.S. Patent 2,959,627. A preferred catalyst which is disclosed in that patent comprises a mixture of copper and chromium oxides supported on alumina. In this manner the organic sulfur compounds are converted to hydrogen sulfide without appreciable hydrogenation of the olefins and conjugated diolefins and the gas is passed via line 9 to the acid gas removal stage designated by numeral 10. Acid gas, such as carbon dioxide and hydrogen sulfide, is removed by scrubbing with caustic or amines. The effluent is carried via line 11 to the drying section 12 where the gas is dried by passing over conventional desiccants as, for example, activated alumina, activated bauxite, Porocel, etc. The dried gas is then conveyed via line 13 to the low temperature absorption section which is designated by numeral 14. Normally liquid pentane is used as an absorbent; however, liquid propane or a mixture of liquid pentane and propane may be utilized. In this section the $C_2$ and higher hydrocarbons are absorbed in the liquid pentane mixture and most of the hydrogen and methane pass overhead via line 15. The absorbent containing the $C_2$ and higher hydrocarbons pass via line 16 to the stripping section designated by numeral 17. In this section the absorbent is heated and the $C_2$ hydrocarbons are passed overhead while the $C_3$ and higher hydrocarbons pass out the bottom with the liquid pentane through line 18. The $C_3$ and higher hydrocarbons which include the purified butenes and butadiene may be stripped from the absorbent and recovered. The $C_2$ hydrocarbons pass via line 19 to a fractionator designated by numeral 20 where the residual methane and hydrogen are separated from the $C_2$ hydrocarbons. The concentrated olefins pass via line 21 to a fractionating column designated by numeral 22 which effects the final separation of the $C_2$ olefins from the $C_2$ paraffins. Some of the concentrated olefins may then be of sufficient purity for many uses such as the production of ethylene oxide and a portion of this material may then be led off for such purposes. However, the material requiring further purification is then passed via line 23 to a hydrogenation reactor designated by numeral 24. This reactor contains a palladium catalyst supported on alumina or silica gel in a concentration of from .01 to 0.1% and effects the final hydrogenation of the unsaturated impurities at a temperature in the range of 100 to 250° F. with as little as 3 mols of hydrogen per mol of unsaturated impurity. By increasing the temperature any residual hydrogen may be consumed in this process if desired. The ethylene thus concentrated to more than 99% contains less than about 5 to 10 p.p.m. of acetylenes or other highly unsaturated impurities.

It will be noted that by use of this process the debutanizing operation prior to the initial hydrogenation is completely eliminated. The $C_4$ olefins and diolefins are preserved and purified from highly unsaturated impurities and optionally from organic sulfur compounds. These materials may be separated from the stripping solution designated by numeral 18 in a form suitable for further use. Also by reason of the milder hydrogenation conditions in the initial hydrogenation zone, less overall olefin loss is encountered and in many cases a net gain of olefins (aside from the recovered butylene and butadiene) is obtained. In addition, it will be noted that by reason of the final purification of the material over a palladium catalyst the concentration of the impurities in the product olefins is in a range of from 5 to 10 p.p.m. as compared to 20 to 50 p.p.m. by conventional processes. The advantages of operating in accordance with our invention can be further illustrated by referring to the following examples:

*Example 1*

A catalysts containing on the final basis:

2.9% nickel sulfide
0.53% cobalt sulfide
0.07% chromium sulfide (all expressed as metals) was prepared by forming an aqueous solution of nickel nitrate, cobalt nitrate and chromic acid of about 16% metal concentration. Sufficient sulfuric acid was added to convert the metal salts to the sulfates and a refractory support was immersed in the solution, dried and calcined at 800° F. for about 12 hours. 25 cc. of the catalyst so prepared was charged to an isothermal reactor which comprised a jacketed iron pipe with an internal diameter of ¾". The catalyst was pretreated by passing hydrogen through the reactor at a temperature of 750 to 800° F. for about 3 hours. Thereafter a raw gas of the following composition was passed through the reactor at a pressure of 350 p.s.i.g., temperature of 450° F. and a space velocity of 2000. The gas mixture was as follows:

| | |
|---|---|
| $C_2H_2$ | 0.7 |
| $C_2H_4$ | 26.5 |
| $H_2$ | 19 |
| $C_4H_6$ | 0.25 |
| COS | 0.037 |
| $C_2H_6$ | Remainder |

At these conditions essentially no ethylene was hydrogenated but approximately 70% of the butadiene was destroyed. The acetylene in the outlet gas was determined to be about 12 p.p.m. or a conversion of acetylene of over 98%. By lowering the temperature to 420° F. and increasing the space velocity of 2700 there was no loss of butadiene but the acetylene concentration in the outlet was about 580 p.p.m. or an acetylene conversion of about 92%.

*Example 2*

A commercial catalyst containing about 20% cobalt molybdate on a medium surface area support was tested under identical conditions and with the identical gas mixture. It was found that at a temperature of 450° F. and a space velocity of 2000 about 50% of the butadiene was destroyed and about 220 p.p.m. of the acetylene leaked in the effluent gas. This amounted to an acetylene conversion of about 97%. By lowering the temperature to 420° F. and increasing the space velocity to 2700 no butadiene was destroyed and the acetylene concentration in the effluent increased to about 1200 to 1500 p.p.m. amounting to an acetylene conversion of about 81%. By lowering the space velocity to about 2500 the acetylene leakage was reduced to about 900 p.p.m. with no appreciable hydrogenation of either butadiene or ethylene. This amounted to an acetylene conversion of about 87%.

It will be noted that the two catalysts are not exactly equivalent in activity but that by varying the temperature and space velocity a good conversion of acetylene can be achieved with no hydrogenation of the desirable butadiene.

*Example 3*

A catalyst prepared identically with that of Example 1 was tested in an identical reactor at a pressure of 175 p.s.i.g., a temperature of 510° F. and a space velocity of 1000 utilizing a gas mixture of the following composition:

| | |
|---|---|
| $C_2H_2$ | 0.5 |
| $C_2H_4$ | 19.9 |
| $H_2$ | 8.3 |
| $C_4H_6$ | 4.7 |
| $C_4H_8$ | 11.1 |
| COS | 0.075 |
| $C_2H_6$ | Remainder |

Essentially no ethylene was hydrogenated and the butadiene loss averaged from 0 to 2%. The acetylene concentration in the effluent was between 90 and 100 p.p.m. or an acetylene conversion of over 98%.

*Example 4*

Utilizing the cobalt molybdate catalyst of Example 2 under the same conditions and with the same gas mixture as tested in Example 3, there was no loss of either ethylene or butadiene and the acetylene in the effluent was in the range of 90 to 110 p.p.m. or an acetylene conversion of about 98%. Raising the temperature to 550° F. about 20% of the butadiene was hydrogenated and the acetylene concentration was about 40 p.p.m.

It will be noted that in Examples 3 and 4 the gas mixture contained about 5% butadiene and over 11% of butylene or a total concentration of unsaturated $C_4$ hydrocarbons of about 15%. In these examples it was possible to obtain a 98% conversion of acetylenes with little or no hydrogenation of butadiene, butylene or ethylene. However, in Examples 1 and 2 (containing only a quarter of one percent of unsaturated $C_4$'s), a conversion of only 87 to 92% was obtained without concomitant hydrogenation of the butadiene. It is felt that the competition of the $C_4$ olefins for the active sites of the catalyst which were unoccupied by the acetylene increased the overall selectivity of the catalyst as to the butadiene. Therefore, even though more butadiene was contained in the gas streams of Examples 3 and 4 as compared to Examples 1 and 2, less butadiene was hydrogenated with a specified acetylene conversion. Of course the effects of the partial pressure of hydrogen and sulfurous compounds as well as flow rate and temperature can not and have not been overlooked. Nevertheless all other factors remaining equal, the selectivity of the catalyst is increased as the partial pressure of $C_4$ olefins is increased.

It will be obvious to those skilled in the art that a novel process for the purification and segregation of olefins has been described which should not be limited in scope except as detailed in the appended claims.

We claim:

1. A process for the purification of desired constituents in an impure gas stream obtained by the pyrolysis of hydrocarbons, said stream containing $C_4$–$C_5$ conjugated diolefins, ethylenes and $C_3$–$C_5$ mono-olefins as the desired constituents and highly unsaturated impurities including acetylenes and alpha beta unsaturated hydrocarbos having no hydrogen atom on the beta carbon atom as the constituents to be removed, comprising the steps of hydrogenating said impure gas stream with hydrogen at a temperature of about 200° F. to about 600° F., a space velocity of about 500–3000 and a pressure of about 1 to 60 atmospheres in the presence of a hydrogenation catalyst selected from the group consisting of oxides and sulfides of cobalt, nickel, molybdenum, chromium, the foregoing metals, mixtures of said metals and mixtures of said sulfides and oxides while regulating the concentration of acetylenes in said impure gas stream to provide a level of from about 80 to about 1000 parts of said acetylenes per million parts of the gas stream at the outlet of the hydrogenation path whereby said acetylenes are selectively adsorbed on active centers of said catalyst at said level of acetylene concentration to effectively exclude adsorption and hydrogenation at said catalyst of conjugated diolefins, ethylene and $C_3$–$C_5$ mono-olefins, physically separating said mixture into a first fraction containing ethylene and residual acetylene and into a second fraction free from acetylene containing conjugated diolefins and $C_3$–$C_5$ mono-olefins, hydrogenating said first fraction in a second hydrogenation step with palladium catalyst at 100–400° F. to reduce said unsaturated impurities to a level of less than 10 parts per million in said first fraction.

2. A process as defined in claim 1 in which the gas stream contains about 5% butadiene and about 11% of butylene and the concentration of acetylene in the treated gas composition is maintained in the range of about 80 to 110 parts per million.

3. A process as defined in claim 1 in which the gas stream contains about ¼% up to 10% butadiene and the concentration of acetylene at the outlet of the treated gas composition in the first hydrogenation is maintained at a level in excess of about 100 parts per million but not greater than 1000 parts per million.

4. A process as defined in claim 1 in which the gas from the first hydrogenation step is passed with an excess of hydrogen over said palladium catalyst, the palladium thereof being present in a concentration of from 0.01 to 0.1% on an inert support and said second hydrogenation being carried out at a temperature of from 100 to 400° F. to remove the unsaturated impurities to a level of about 0–10 parts per million.

References Cited in the file of this patent

UNITED STATES PATENTS

| | | |
|---|---|---|
| 2,511,453 | Barry | June 13, 1950 |
| 2,802,889 | Frevel et al. | Aug. 13, 1957 |
| 2,814,653 | Hogan et al. | Nov. 26, 1957 |
| 2,840,531 | Fleming et al. | June 24, 1958 |
| 2,909,578 | Anderson et al. | Oct. 20, 1959 |